(No Model.)
G. W. MELOTTE & C. M. CLINTON.
BENCH BLOCK FOR DENTISTS, JEWELERS, AND OTHERS.
No. 482,453. Patented Sept. 13, 1892.
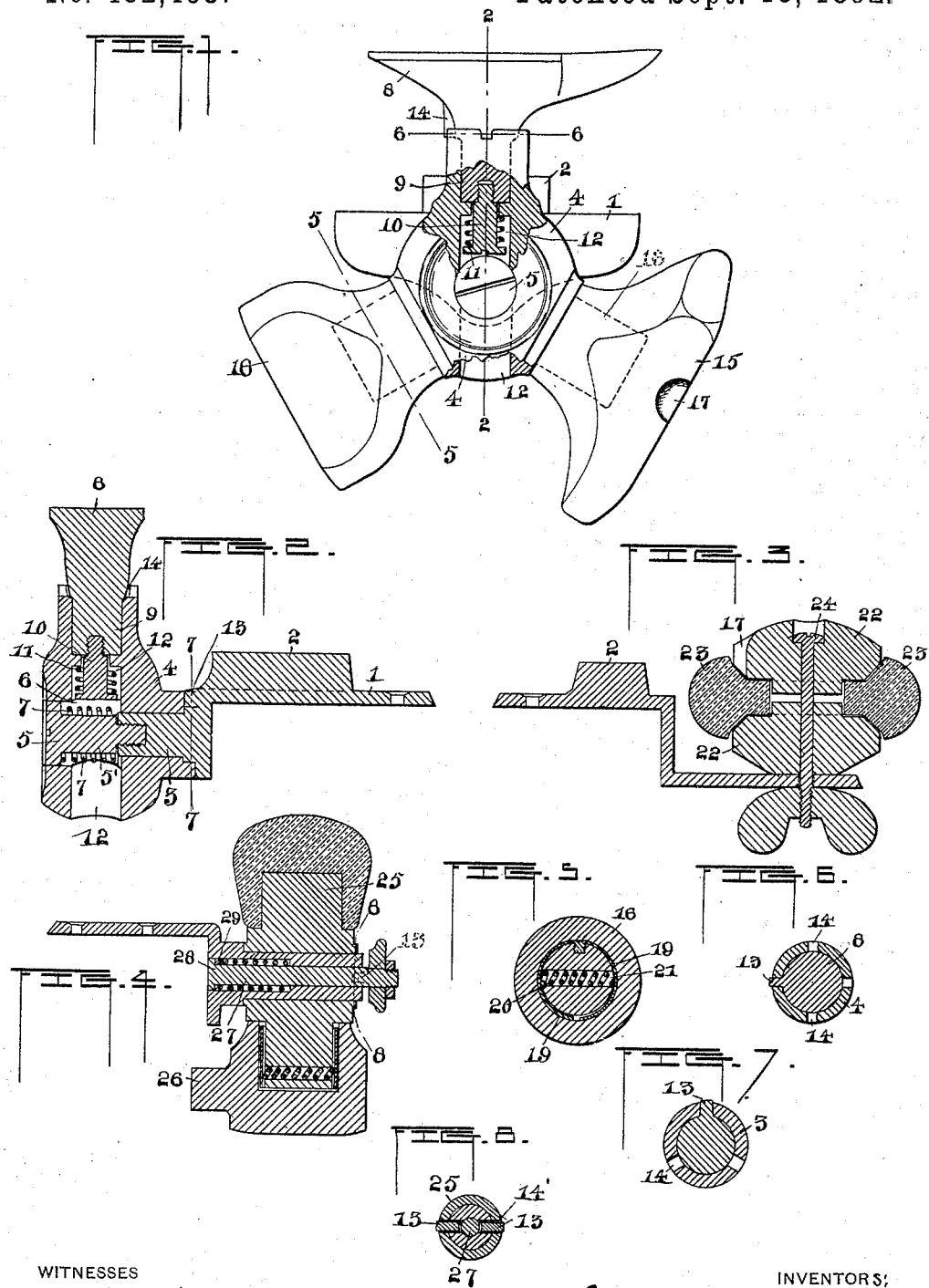
WITNESSES
Arch. M. Catlin
O. H. Kean
INVENTORS:
George W. Melotte
Charles M. Clinton
by Benj. R. Catlin atty.

UNITED STATES PATENT OFFICE.

GEORGE W. MELOTTE AND CHARLES M. CLINTON, OF ITHACA, NEW YORK; SAID CLINTON ASSIGNOR TO SAID MELOTTE.

BENCH-BLOCK FOR DENTISTS, JEWELERS, AND OTHERS.

SPECIFICATION forming part of Letters Patent No. 482,453, dated September 13, 1892.

Application filed May 14, 1892. Serial No. 433,036. (No model.)

*To all whom it may concern:*

Be it known that we, GEORGE W. MELOTTE and CHARLES M. CLINTON, residents of Ithaca, in the county of Tompkins and State of New York, have invented certain new and useful Improvements in Bench-Blocks; and we do hereby declare the following to be a full, clear, and exact description of the invention, such as will enable others skilled in the art to which it pertains to make and use the same.

The invention relates to a bench-block suitable for metal workers and for the use of dentists, jewelers, and others; and its object is to increase the capacity and efficiency of devices of this character; and it consists in the construction hereinafter described, and particularly pointed out in the claims.

In the accompanying drawings, Figure 1 is a front elevation partly in section. Fig. 2 is a section on line 2 2 of Fig. 1. Figs. 3 and 4 are central sections of modified forms. Fig. 5 is a section on line 5 5 of Fig. 1. Fig. 6 is a section on line 6 6 of Fig. 1. Fig. 7 is a section on line 7 7 of Fig. 2, and Fig. 8 is a section on line 8 8 of Fig. 4.

Numeral 1 denotes a bracket adapted to be screwed upon a bench or table and provided with an anvil 2.

3 denotes a stud formed on the bracket and adapted to rotatably support a hub 4, which is provided with a suitable opening for the purpose. The hub is secured upon said stud in a yielding manner by means of a screw-plug 5, having a screw-threaded end engaging a suitable socket in the stud and an enlarged body 5' and a head. The hub is provided with an enlarged opening 6, as shown, which receives the head of the plug, so that the latter constitutes a part of the hub-axis.

7 is a spring surrounding the plug within the passage 6 and adapted to bear on the head of the plug and on the hub in such manner as to hold the hub upon the stud and against the bracket.

8 denotes a removable and rotatable anvil provided with a foot adapted to enter a socket 9 in the hub.

10 is a screw-plug, and 11 a spring for holding the hub in its seat in a yielding manner, the hub being cored out transversely to passage 6 at 12 to receive said plug 10, as shown. When the screw-plug 5 has been removed, access is given through passage 12 to the screw-plug 10. The spring above referred to, both in the case of the hub and of the anvil, can be compressed and a pin or finger 13 thereby withdrawn from a notch 14, whereby the hub or the anvil, as the case may be, is unlocked so as to permit it to be turned to a different position. Separate notches are provided to lock the parts in any desired position. The hub is made rotatable and provided with arms or sockets to adapt it to suitably support other devices, next to be described.

15 denotes a rubber block fitted upon a stud 16, fast on the hub and removably held thereon by its elasticity or by friction. The compressibility of the rubber adapts it to serve as a filing-bed and for other purposes.

17 denotes a notch in its upper edge intended to receive a portion of an article operated on, whereby it may be held more securely and conveniently.

18 denotes a wooden anvil or block fitted upon a suitable stud on the hub. To hold it removably and yet in a firm manner on said stud, a split ring or thimble 19 is placed on the stud and within the wooden block. A spring 20 is placed in a transverse slot 21 in the stud and adapted to spread the split thimble and increase its friction upon the interior of the block.

30 is a screw to hold the thimble on the stud.

The three work-supports, blocks, or anvils described are situated at equal distances about the hub, which can be turned to bring uppermost the one desired for use at any time and locked in such position, the other two blocks being at such time below and out of the way.

In Fig. 3 is shown a bracket provided with an anvil 2, a two-part wooden block 22, and a rubber work-support 23. This latter is held between the two parts of the block by means of a screw-bolt 24, provided with a thumb-nut, whereby the two-part block can be clamped upon the rubber and the whole fastened to the bracket. A notch to receive part of an article resting upon the block is indicated at 10

17. It will be noted that both the wooden block and the rubber ring can be horizontally adjusted when the bolt is loosened.

In Fig. 4 is shown a two-armed hub 25, provided with a rubber and wooden block, the latter also being furnished with a cylindrical extension 26.

27 is a bolt provided with a head 28, having a finger or pin 13, adapted to engage notches 14'. These notches are formed both in the hub and in the stud of the bracket, and when brought in proper alignment are adapted to receive a pin. They are situated ninety degrees apart in the present instance. The interior coil-spring bears upon the inner bolt-head and upon the bracket in manner to hold the hub on the bracket-stud and the pin in its notches when suitably arranged. A washer 29 is interposed between the spring and bolt, as indicated.

The particular material of the several anvils or blocks is not of the gist of the invention so much as the constructions whereby different blocks are adjustably supported upon a single bracket. The particular situation of the pins 13 and their notches may be exchanged and their form and number varied. The special kind of locking devices is not essential to the improvement.

Having thus described our invention, what we claim is—

1. In combination, the bracket having a hub-supporting stud, the transversely cored-out hub having a bore 6 and adapted to support two or more blocks of different character at an angle to the stud, the plug screwing into the stud and provided with a head fitting said bore, and a spring bearing in said head and on the hub, whereby the hub is held endwise on the stud, substantially as set forth.

2. The combination of the bracket adapted to be attached to a bench or table and provided with a hub-supporting stud and a multiple-armed hub rotatably secured thereon, provided with sockets each having a block, and a lock adapted to hold the hub in any desired one of several situations, substantially as set forth.

3. The combination, with a bracket and with a rotatably-adjustable and socketed hub, of an anvil supported in one of said sockets and a lock adapted to secure the anvil in different positions when suitably rotated, substantially as set forth.

4. In combination, the bracket having a hub-supporting stud 3, the hub provided with passage 6 to receive the stud and provided, also, with passage 12 to permit the insertion of an anvil-fastening screw-plug 10 and to give access to the said plug for its removal, and a detachable anvil 18, substantially as set forth.

5. The combination of the bracket provided with a pin and with a stud and having a plurality of block-supporting arms and the block-supporting hub fitted to be supported and turned upon said stud and having, also, notches to receive said pin, substantially as set forth.

6. The combination of the bracket provided with a pin and with a stud and having a plurality of block-supporting arms, and the block-supporting hub fitted to be supported and turned upon said stud and having, also, notches to receive said pin, and a spring normally holding the pin in the notch when they are suitably engaged to lock the hub against rotation, substantially as set forth.

7. In combination with the block-supporting stud, the split thimble, the spring tending to spread said thimble situated in a recess in the stud, and said block suitably apertured to embrace the thimble on the stud, substantially as set forth.

In testimony whereof we have signed this specification in the presence of two subscribing witnesses.

GEORGE W. MELOTTE.
CHARLES M. CLINTON.

Witnesses:
WM. HAZLITT SMITH,
Mrs. WM. HAZLITT SMITH.